March 10, 1959 J. J. TETYAK 2,876,854
VEHICLE HAVING CONTROL FOR FLUID POWER MECHANISM THEREOF
Filed Oct. 15, 1956 2 Sheets-Sheet 1
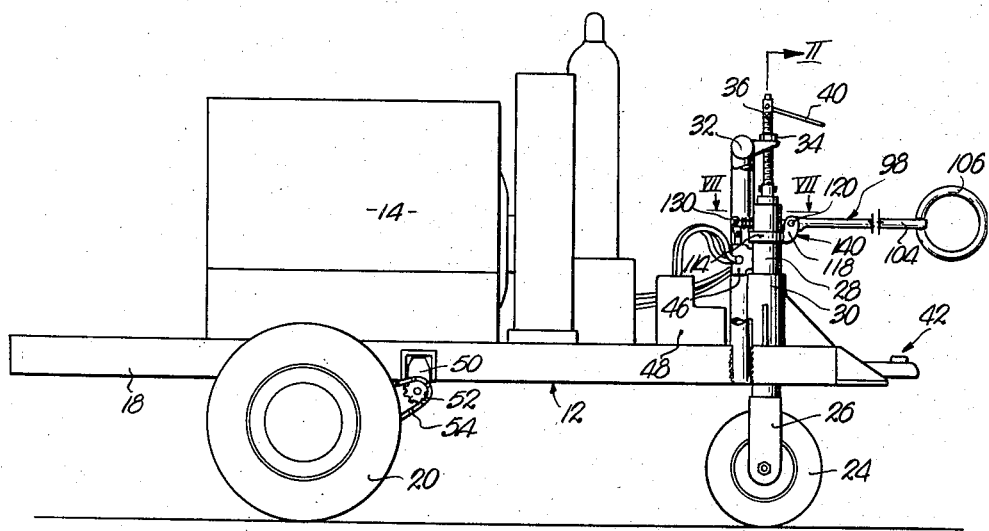
Fig. 1.
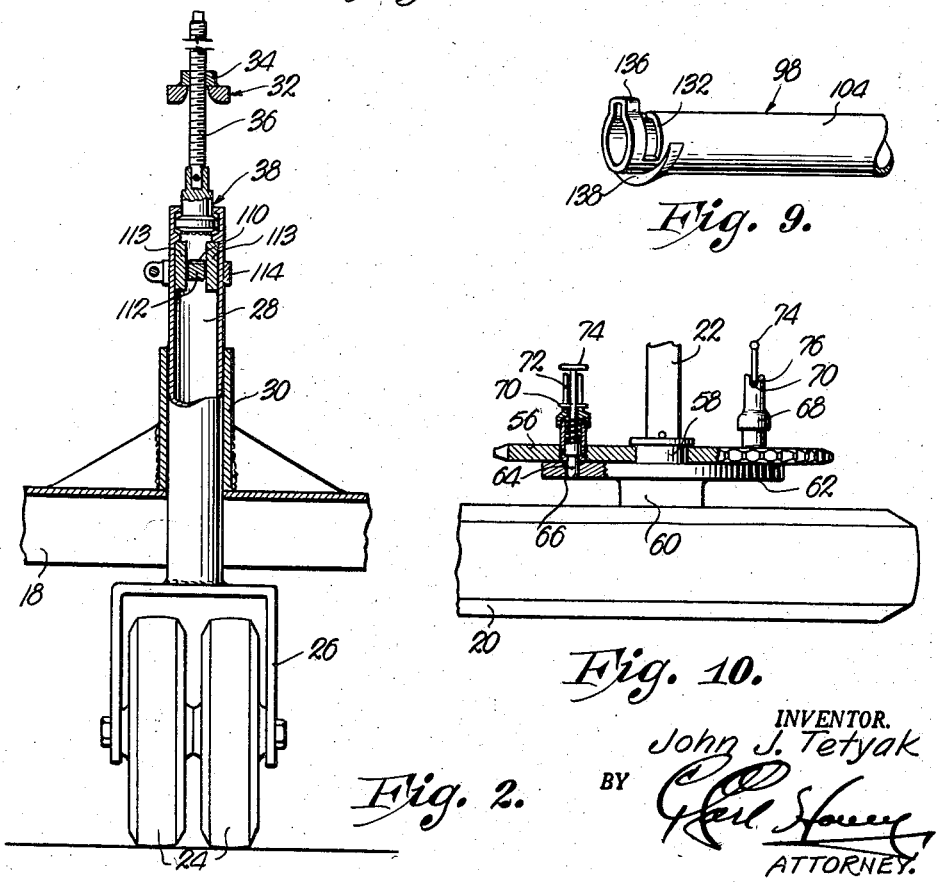
Fig. 9.
Fig. 10.
Fig. 2.
INVENTOR.
John J. Tetyak
BY
ATTORNEY.

March 10, 1959      J. J. TETYAK      2,876,854
VEHICLE HAVING CONTROL FOR FLUID POWER MECHANISM THEREOF
Filed Oct. 15, 1956      2 Sheets-Sheet 2
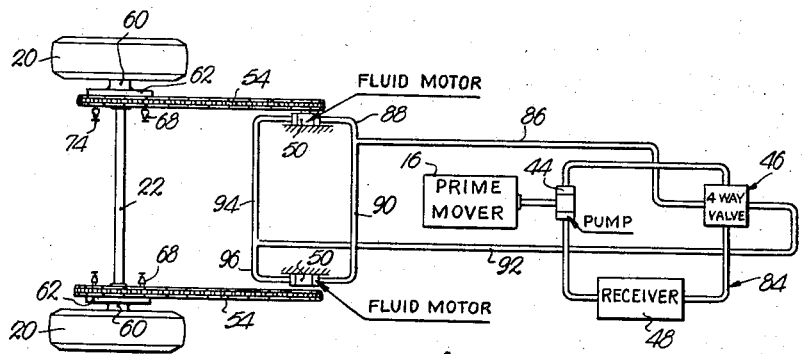
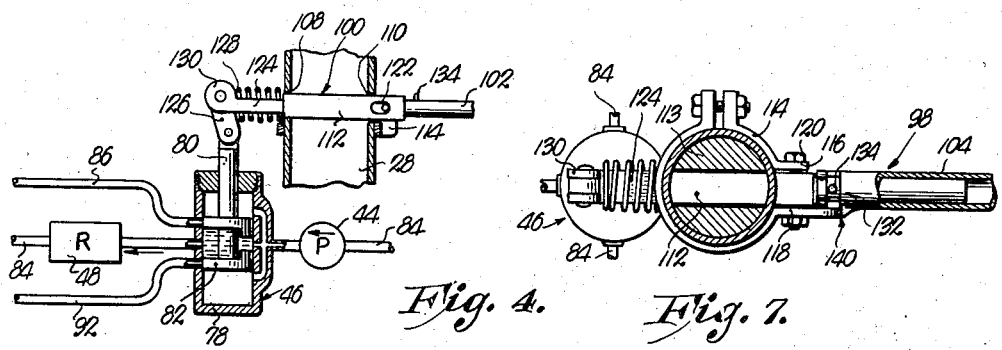
INVENTOR.
John J. Tetyak
BY
ATTORNEY

United States Patent Office 2,876,854
Patented Mar. 10, 1959

2,876,854

VEHICLE HAVING CONTROL FOR FLUID POWER MECHANISM THEREOF

John J. Tetyak, Overland Park, Kans.

Application October 15, 1956, Serial No. 615,799

14 Claims. (Cl. 180—19)

This invention relates to improvements in trailers or other vehicles employing fluid power means operably connected with the drive wheels thereof for motivating the same, the primary object being to include as a part of such power mechanism, novel control means not only for the fluid system but for the purpose of guiding the vehicle.

It is the most important object of the present invention to provide a vehicle for welding equipment or the like adapted for operating the fluid pump of the power motivating mechanism from an internal combustion engine forming a part of the generator drive for the welding equipment and including a caster wheel that is guided in a novel manner through a control that is also operably coupled with a valve forming a part of the fluid system.

Another important object of the instant invention is to provide a vehicle of the aforementioned character that has incorporated therein a handle bar for guiding a caster wheel and which handle bar is also swingable with respect to the swivel post of the caster wheel and operably coupled with the valve of the fluid system to control the latter upon swinging of the bar relative to the post.

A further important object of the instant invention is to provide in structure of the aforementioned character a composite control that includes the valve, the handle bar and associated parts, all mounted on the rotatable swivel post of the caster wheel for rotation therewith and for vertical reciprocation with the post when the latter is retracted to withdraw the caster wheel while the trailer is coupled with a towing vehicle.

Another important object of the present invention is the provision of novel locking means for the handle bar structure which prevents swinging movement thereof and, therefore, accidental forward or reverse movement of the vehicle, until the handle bar is retracted from a locking position by rotation thereof to render certain cam means effective in the withdrawing operation.

A still further object of the instant invention is the provision of a unique arrangement between the handle bar and the said swivel post which provides locking as aforementioned whenever the handle bar is within a pair of aligned openings, but permits swinging movement when the handle bar is rotated to withdraw one section of the handle bar against the action of a spring or the like.

Other objects of the instant invention relate to the way in which the aforementioned spring also yieldably maintains the handle bar intermediate the ends of its swinging path of travel; the way in which the said handle bar serves the additional purpose of rotating the swivel post; the manner of providing the various movements for the handle bar through use of pin-slot pivot means and a swingable link that pivotally interconnects the handle bar and the reciprocable piston of the valve; the way in which the fluid motors are operably connected with the drive wheels of the vehicle only when the said vehicle is supported by said drive wheels and the caster wheel; and many important details of construction, all of which will be made clear as the following specification progresses.

In the drawings:

Figure 1 is an elevational view of a vehicle control for fluid power mechanism thereof made pursuant to my present invention.

Fig. 2 is an enlarged, fragmentary, detailed, cross-sectional view taken on line II—II of Figure 1.

Fig. 3 is a schematic plan view illustrating the operable connection between the fluid power mechanism and the drive wheels of the vehicle.

Fig. 4 is an enlarged, fragmentary, vertical, cross-sectional view of the 4-way valve of the fluid power mechanism and the control therefor.

Fig. 5 is a view similar to Fig. 4 but illustrating the parts in an operating position for driving the vehicle in one direction.

Fig. 6 is a view similar to Figs. 4 and 5 illustrating the parts in a position for driving the vehicle in the opposite direction.

Fig. 7 is an enlarged, fragmentary, cross-sectional view taken on line VII—VII of Fig. 1.

Fig. 8 is a view similar to Fig. 7 showing the reciprocable section of the handle bar retracted.

Fig. 9 is an enlarged, perspective view of the innermost end of the rotatable section of the handle bar; and Fig. 10 is an enlarged, fragmentary, cross-sectional view illustrating the operable connection between one of the drive wheels and the power drive therefor.

The improvements forming the subject of the instant invention have been particularly adapted for use in connection with a vehicle, broadly designated by the numeral 12, used to support welding equipment generally designated by the numeral 14, but it is to be understood that other than the fact that the equipment 14 is provided with a prime mover 16 (see Fig. 3) for operating a generator (not shown) the precise nature of the equipment 14 has no bearing upon the invention about to be described.

The equipment 14 is supported in its entirety by a suitable frame 18 that is in turn supported by a pair of drive wheels 20 having an axle 22 and a caster wheel or wheels 24. Wheels 24 are rotatable within a yoke 26 that is in turn rigid to the lowermost end of a vertical swivel post 28 rotatable within a tubular bearing 30 that is rigid to frame 18. A U-shaped secondary frame 32 rigid to the frame 12 and extending upwardly therefrom is provided with a nut 34 rigidly connected to the bight thereof for receiving an adjusting screw 36. A rotatable connection 38 is provided between screw 36 and post 28 and it is, therefore, apparent that upon rotation of the screw 36 through use of a handle 40, the wheels 24 may be retracted when the vehicle 12 is placed in tow through use of a conventional trailer-type coupling 42 at the forwardmost end of the frame 18.

A hydraulic power mechanism is provided for driving the wheels 20 including, as best seen in Fig. 3 of the drawings, a pump 44 operably connected with the prime mover 16, a 4-way valve 46, a fluid receiving tank 48 and a pair of fluid motors 50, one for each wheel 20 respectively.

Fluid motors 50 carried by frame 18 as seen in Figure 1, may be of conventional character and include a pair of intermeshing gears that are driven alternately in either of two directions by the hydraulic fluid forced therethrough by pump 44. Each motor 50 is provided with a sprocket wheel 52 that is operably coupled with the associated wheel 20 through the medium of a continuous chain 54. The connections between the chains 54 and the wheels 20 are best illustrated in Fig. 10 of the drawings and include a sprocket wheel 56 around which chain 54 is trained. A bearing 58 on axle 22 rotatably receives the sprocket wheel 56 and hub 60 of wheel 20 has a plate or disc 62 rigidly secured thereto.

A plurality of spring-loaded pins 64 interconnect the sprocket wheels 56 with proximal discs 62, it being noted that the discs 62 are provided with holes 66 normally receiving the pins 64. Tubular housings 68 for reciprocably receiving the pins 64 are rigidly connected to the sprocket wheel 56 and when the pins 64 are in the openings 66, a cross rod 70, traversing the pins 64, is disposed within aligned slots 72 formed in the housing 68. The pins 64 may be retracted from the openings 66 by pulling outwardly on a cross handle 74 thereon and repositioning the rod 70 within aligned slots 76 of the housing 68 after rotating the pins 64 90°.

The valve 46 may be of any conventional character, but as seen in Fig. 4 of the drawings, the one chosen for illustration includes a cylinder 78 provided with a vertically reciprocable stem 80 having a plurality of discs or the like 82 for controlling the flow of fluid pumped through the hydraulic system.

When the valve 46 is in the position shown in Fig. 4 and during operation of the prime mover 16, the fluid is pumped to the receiver 48, through the valve 46 and back to pump 44 by way of a continuous line broadly designated by the numeral 84.

When the valve 46 is in the position shown in Fig. 5, the fluid flows from the pump 44 to a line 86 and thence to motors 50 by way of branches 88 and 90 to drive the said motors 50 and, therefore, the wheels 20 in one direction. Fluid returns to the valve 46 and thence to the receiver 48 by way of a line 92 having connection with the motors 50 by branches 94 and 96.

When the valve 46 is in the position shown in Fig. 6 of the drawings, the fluid is pumped from the valve 46 to line 92 and branches 94—96 to drive the motors 50 and, therefore, the wheels 20, in the opposite direction. Fluid returns to the valve 46 and thence to the receiver 48 by way of branches 88 and 90 and line 86.

A handle bar broadly designated by the numeral 98 is provided to not only rotate the swivel post 28 and, therefore, guide the caster wheels 94, but to control the valve 46. The handle bar 98 includes a short section 100 that is transversely polygonal except for the provision of a terminal end 102 that is preferably circular transversely thereof to rotatably receive the proximal end of a tubular section 104 forming a part of the handle bar 98. The outermost free end of the section 104 of the handle bar 98 is provided with a loop or other hand grip means 106 to facilitate rotation and swinging of the handle bar 98 in the manner hereinafter to be made clear.

The section 100 of the bar 98 normally extends through polygonal openings 108 and 110 in the post 28 having configurations substantially complemental with that of a median length 112 of section 100. Such length 112 is slidable between a pair of spacers or guides 113 within the post 28 and may be substantially square, and the sizes of the openings 108 and 110 should be such as to provide a relatively loose fit of the length 112 therewithin, but restrict the same from rotational movement.

A clamp 114 on the post 28 is provided with forwardly extending ears 116 and 118 that are interconnected by a pivot bolt 120. The median length 112 of section 100 is disposed between the ears 116 and provided with an elongated slot 122 receiving the pivot bolt 120.

That end or length 124 of the section 100 opposite to the circular length 102, is rectangular in transverse cross-section, having a vertical thickness or dimension less than that of the opening 108 and the median section 112. The outermost free end of the length 124 is bifurcated for receiving a link 126 which pivotally interconnects the section 100 and the stem 80, the uppermost end of the latter being bifurcated for receiving the link 126. A spring 128 coiled about the length 124 between post 28 and ears 130 on the length 124, yieldably biases the section 100 to one end of its path of travel as shown in Fig. 4, with the median length 112 thereof disposed within both of the openings 108 and 110. Spring 128 also serves to yieldably bias the handle bar 98 to a substantially horizontal position when the length 112 of section 100 is retracted from the opening 108 in the manner illustrated in Figs. 5 and 6. The extent of reciprocable movement of the section 100 against the action of spring 128 is limited by pivot bolt 120 and slot 122 as also seen in Figs. 5 and 6.

A cam arrangement is provided for withdrawing the section 100 against the action of spring 128 upon rotation of section 104 as best seen in Figs. 1, 7 and 8. Referring to Fig. 9, it is seen that the innermost end of the section 104 of handle bar 98 is provided with a slot 132 that clears a radial stop 134 on the length 102 of section 100 during rotation of the section 104 with respect to the section 100.

A radial loop 136 on the innermost end of section 104 clears the stop 134 when it is desired to remove the section 104 from the section 100. A spiral cam 138 on the outer face of the section 104 engages an arcuate cam edge 140 on the ear 118 of the clamp 114. Consequently, during rotation of section 104 in one direction, cam edge 138 riding along cam edge 140, causes the section 100 to move outwardly away from the post 28. As a consequence of such action, the section 100 is withdrawn in the same direction as the latter is held against rotation by the openings 108 and 110 and as the innermost edge of the slot 132 slides along the stop 134.

It is now apparent that the valve 46 is normally in the position shown in Fig. 4 of the drawings and cannot be actuated while the median length 112 of section 100 is held within both openings 108 and 110 by spring 128. While the manual control for valve 46 is thus held in a locked position, it is still possible however, to utilize the handle bar 98 to guide the caster wheels 24 by swinging bar 98 horizontally since both valve 46 and its control are mounted on the post 28 for rotation therewith. In this connection, the cylinder 78 may be attached to post 28 through use of the clamp 114 or otherwise.

When it is desired to move the vehicle 12, the operator grasps the hand grip 106 and rotates the section 104 to withdraw the length 112 of section 100 from within the opening 108 against the action of spring 128. Thereupon the bar 98 may be swung vertically about the axis of pivot bolt 120 since there is a sufficiently loose fit within the opening 110 to permit such vertical swinging movement.

With prime mover 16 and, therefore, pump 44, operating continuously, the wheels 20 will be driven in either of two directions depending upon the position of bar 98 as seen in Figs. 5 and 6, whenever there is an operable connection between sprocket wheels 56 and discs 62, as shown in Fig. 10.

It is to be noted also that swinging of the bar 98 to the uppermost and lowermost ends of its path of travel, does not prevent the operator from at the same time swinging the handle bar 98 horizontally to guide the caster wheels 24 while the vehicle 12 is moving forwardly or in reverse. As soon as the hand grip 106 is released, the spring 128 will return the handle bar 98 to the horizontal position and the median section 112 will be forced thereby into the opening 108 to lock the control against vertical swinging movement.

Still further, it is to be noted that when the vehicle 12 is to be placed in tow, the caster wheels 24 may be retracted upwardly by use of handle 40 and screw 36 since the valve 46 and the handle bar 98 are connected with the post 28 for vertical movement therewith. When the vehicle 12 is placed in tow through use of coupling 42, it is to be preferred that the sprocket wheels 56 and the discs 62 be disconnected by pulling outwardly on the pins 64 and positioning the rods 70 within the slots 76 as above explained.

The use of fluid motors 50 is particularly advantageous because the same act as brakes to immediately stop movement of vehicle 12 upon release of bar 98, but additional automatic brake means may be provided if desired.

Having thus described the invention what is claimed as new and desired to be secured by Letters Patent is:

1. In combination with a mobile vehicle having a drive wheel and a caster wheel; a fluid motor operably connected with said drive wheel for driving the same; a valve coupled with said motor for controlling the flow of fluid therethrough; a control member swingable horizontally and vertically along a pair of intersecting paths of travel; means operably connecting the member with the caster wheel for guiding the latter upon swinging the member horizontally along one of said paths of travel; and means operably connecting the member with the valve for actuating the latter upon swinging the member vertically along the other of said paths of travel.

2. In combination with a mobile vehicle having a drive wheel and a caster wheel; a fluid motor operably connected with said drive wheel for driving the same; a valve coupled with said motor for controlling the flow of fluid therethrough; an elongated control member swingable along a pair of intersecting paths of travel and reciprocable longitudinally thereof; means operably connecting the member with the caster wheel for guiding the latter upon swinging the member along one of said paths of travel; means operably connecting the member with the valve for actuating the latter upon swinging the member along the other of said paths of travel; and means locking said member against swinging movement along said other path of travel when the member is at one end of its reciprocable path of travel.

3. In combination with a mobile vehicle having a drive wheel and a caster wheel, the latter being provided with a vertical swivel post; an elongated handle bar extending from the post for rotating the latter to guide the vehicle; a fluid motor operably connected with said drive wheel for driving the same; a valve coupled with said motor for controlling the flow of fluid therethrough and mounted on said post for rotation therewith, said bar being mounted on the post for vertical swinging movement and for reciprocation on its longitudinal axis; means operably connecting the bar with the valve for controlling the latter as the bar is swung relative to the post; and means on the post locking said bar against swinging movement relative to the post when the bar is at one end of its reciprocable path of travel.

4. In combination with a mobile vehicle having a drive wheel and a caster wheel, the latter being provided with a vertical swivel post; an elongated handle bar extending from the post for rotating the latter to guide the vehicle; a fluid motor operably connected with said drive wheel for driving the same; a valve coupled with said motor for controlling the flow of fluid therethrough and mounted on said post for rotation therewith, said bar being mounted on the post for vertical swinging movement and for reciprocation on its longitudinal axis; means operably connecting the bar with the valve for controlling the latter as the bar is swung relative to the post; means on the post locking said bar against swinging movement relative to the post when the bar is at one end of its reciprocable path of travel; and means interposed between the post and the bar for yieldably holding the latter biased to said one end of its reciprocable path of travel.

5. In combination with a mobile vehicle having a drive wheel, and a caster wheel provided with a rotatable post; a fluid motor operably connected with said drive wheel for driving the same; a valve coupled with said motor for controlling the flow of fluid therethrough; a rotatable and reciprocable control member swingable along a pair of intersecting paths of travel; means operably connecting the member with the post for rotating the latter upon swinging the member along one of said paths of travel; means operably connecting the member with the valve for actuating the latter upon swinging the member along the other of said paths of travel; means locking said member against swinging movement along said other path of travel when the member is at one end of its reciprocable path of travel; and means interposed between the member and the post for shifting the member to the opposite end of its said reciprocable path of travel upon rotation of the member in one direction.

6. In combination with a mobile vehicle having a drive wheel and a caster wheel, the latter being provided with a vertical swivel post; an elongated, rotatable handle bar extending from the post for rotating the latter to guide the vehicle; a fluid motor operably connected with said drive wheel for driving the same; a valve coupled with said motor for controlling the flow of fluid therethrough and mounted on said post for rotation therewith, said bar being mounted on the post for vertical swinging movement and for reciprocation on its longitudinal axis; means operably connecting the bar with the valve for controlling the latter as the bar is swung relative to the post; means on the post locking said bar against swinging movement relative to the post when the bar is at one end of its reciprocable path of travel; means interposed between the post and the bar for yieldably holding the latter biased to said one end of its reciprocable path of travel; and means interposed between the bar and the post for shifting the bar to the opposite end of its said reciprocable path of travel upon rotation of the bar in one direction.

7. In a control for a device having a shiftable element; a support; an elongated rotatable member carried by the support for reciprocation on its longitudinal axis and swinging movement relative to the support; means on the support holding the member against swinging movement when the member is at one end of its reciprocable path of travel; means coupling the member with the element for shifting the latter upon swinging of the member when the latter is at the opposite end of its reciprocable path of travel; and cam means interposed between the member and the support for moving the member to said opposite end of its path of travel upon rotation of the member.

8. In a control for a device having a shiftable element; a support; an elongated member rotatably carried by the support for reciprocation on its longitudinal axis and swinging movement relative to the support; means on the support holding the member against swinging movement when at one end of its reciprocable path of travel; means yieldably biasing the member to said one end of its reciprocable path of travel and intermediate the ends of its swinging path of travel; and means coupling the member with the element for shifting the latter upon swinging of the member when the latter is at the opposite end of its reciprocable path of travel; and cam means interposed between the member and the support for moving the member to said opposite end of its path of travel upon rotation of the member.

9. In a control for a device having a shiftable element; a support; an elongated, rotatable member carried by the support for reciprocation on its longitudinal axis and swinging movement relative to the support; means on the support holding the member against swinging movement when at one end of its reciprocable path of travel; means yieldably biasing the member to said one end of its reciprocable path of travel; means coupling the member with the element for shifting the latter upon swinging of the member when the latter is at the opposite end of its reciprocable path of travel; and means interposed between the member and the support for shifting the member to said opposite end of its reciprocable path of travel upon rotation of the member in one direction.

10. In a control for a device having a shiftable element; support means having a pair of spaced openings; an elongated handle bar having a pair of relatively rotatable sections, one of the sections normally extending through both of said openings for reciprocation therein;

resilient means between the said support means and the one section yieldably biasing the latter to one end of its reciprocable path of travel; means for withdrawing the one section from one of said openings to the opposite end of its said reciprocable path of travel against the action of said resilient means upon rotation of the other section relative to said one section, said one section being swingable within the other of said openings when the same is withdrawn from said one opening; and means coupling said one section with said element for shifting the latter upon swinging of the bar while the one section is withdrawn.

11. In a control for a device having a shiftable element; support means having a pair of spaced openings; an elongated handle bar having a pair of relatively rotatable sections, one of the sections normally extending through both of said openings for reciprocation therein; pivot means swingably mounting said one section on the support; resilient means between the said support means and the one section yieldably biasing the latter to one end of its reciprocable path of travel; means for withdrawing the one section from one of said openings to the opposite end of its said reciprocable path of travel against the action of said resilient means upon rotation of the other section relative to said one section, said one section being swingable within the other of said openings about said pivot means when the same is withdrawn from said one opening, said one section having a slot clearing the pivot means for reciprocation of the one section relative thereto; and means coupling said one section with said element for shifting the latter upon swinging of the bar while the one section is withdrawn.

12. In a control for a device having a shiftable element; support means having a pair of spaced openings; an elongated handle bar having a pair of relatively rotatable sections, one of the sections normally extending through both of said openings for reciprocation therein; resilient means between the said support means and the one section yieldably biasing the latter to one end of its reciprocable path of travel; cam means for withdrawing the one section from one of said openings to the opposite end of its said reciprocable path of travel against the action of said resilient means upon rotation of the other section relative to said one section, said one section being swingable within the other of said openings when the same is withdrawn from said one opening, said cam means including interengaging surfaces on the support and said other section respectively and interengaging surfaces on each of said surfaces respectively; and means coupling said one section with said element for shifting the latter upon swinging of the bar while the one section is withdrawn.

13. In a control for a device having a shiftable element; support means having a pair of spaced openings; an elongated handle bar having a pair of relatively rotatable sections, one of the sections normally extending through both of said openings for reciprocation therein, said one section and said openings having relative dimensions and configurations for holding the one section against rotation relative to the support means; resilient means between the said support means and the one section yieldably biasing the latter to one end of its reciprocable path of travel; means for withdrawing the one section from one of said openings to the opposite end of its said reciprocable path of travel against the action of said resilient means upon rotation of the other section relative to said one section, said one section being swingable within the other of said openings when the same is withdrawn from said one opening; and means coupling said one section with said element for shifting the latter upon swinging of the bar while the one section is withdrawn.

14. In a control for a device having a vertically reciprocable element; vertical support means having a pair of spaced openings; an elongated handle bar having a pair of relatively rotatable sections, one of the sections normally extending through both of said openings for horizontal reciprocation therein; resilient means between the said support means and the one section yieldably biasing the latter to one end of its reciprocable path of travel; means for withdrawing the one section from one of said openings to the opposite end of its said reciprocable path of travel against the action of said resilient means upon rotation of the other section relative to said one section, said one section being vertically swingable within the other of said openings when the same is withdrawn from said one opening; and a vertically swingable link pivotally coupling said one section with said element for reciprocating the latter upon swinging of the bar while the one section is withdrawn.

References Cited in the file of this patent

UNITED STATES PATENTS

| | | |
|---|---|---|
| 1,539,186 | Heller | May 26, 1925 |
| 2,094,976 | Bachman | Oct. 5, 1937 |
| 2,512,312 | Deardorff et al. | June 20, 1950 |
| 2,604,109 | Tuttle | July 22, 1952 |
| 2,745,506 | McCallum | May 15, 1956 |